United States Patent
Sayre

(10) Patent No.: US 10,169,190 B2
(45) Date of Patent: Jan. 1, 2019

(54) CALL TRACE GENERATION VIA BEHAVIOR COMPUTATION

(71) Applicant: Lenvio Inc., Manassas, VA (US)

(72) Inventor: Kirk Damon Sayre, Knoxville, TN (US)

(73) Assignee: Lenvio Inc., Manassas, VA (US)

( * ) Notice: Subject to any disclaimer, the term of this patent is extended or adjusted under 35 U.S.C. 154(b) by 0 days.

(21) Appl. No.: 15/709,825

(22) Filed: Sep. 20, 2017

(65) Prior Publication Data
US 2018/0081777 A1    Mar. 22, 2018

Related U.S. Application Data

(60) Provisional application No. 62/397,747, filed on Sep. 21, 2016.

(51) Int. Cl.
  *G06F 11/30* (2006.01)
  *G06F 11/36* (2006.01)
  *G06F 21/50* (2013.01)
  *G06F 21/54* (2013.01)

(52) U.S. Cl.
  CPC ........ G06F 11/3612 (2013.01); G06F 11/302 (2013.01); G06F 11/3636 (2013.01); G06F 21/50 (2013.01); G06F 21/54 (2013.01); *G06F 2221/033* (2013.01)

(58) Field of Classification Search
  CPC ............... G06F 11/302; G06F 11/3612; G06F 11/3636; G06F 21/50; G06F 21/54; G06F 2221/033
  USPC .................................................. 717/124–135
  See application file for complete search history.

(56) References Cited

U.S. PATENT DOCUMENTS

| | | | | |
|---|---|---|---|---|
| 8,555,385 | B1* | 10/2013 | Bhatkar | G06F 21/556 726/22 |
| 2005/0268338 | A1* | 12/2005 | Made | G06F 21/562 726/24 |
| 2005/0273757 | A1* | 12/2005 | Anderson | G06F 8/75 717/100 |

OTHER PUBLICATIONS

Linger et al., "Function Extraction Technology: Computing the Behavior of Malware," Feb. 2011. (Year: 2011).*

* cited by examiner

*Primary Examiner* — Qing Chen
(74) *Attorney, Agent, or Firm* — Garlick & Markison; Randy W. Lacasse

(57) ABSTRACT

A method and system to detect behaviors of operational computer code. The method begins by tracking a synthetic call trace state variable when extracting the computed behavior of the program. The method continues by extending instruction semantics of call instructions with additional semantics by adding a current function call, either local or external API, to an existing call trace represented by the synthetic call trace state variable. A method finishes with extracting the computed behavior of a program.

18 Claims, 5 Drawing Sheets

Program:  202
```
Do    x:= x+y;
      y:= x-y;
      x:= x-y
endDo
```

Function Extraction:

| Assignment | x | y |
|---|---|---|
| 1  x:= x+y; | x1 = x0 +y0 | y1 = y0 |
| 2  y:= x-y; | x2 = x1 | y2 = x1 -y1 |
| 3  x:= x-y | x3 = x2 - y2 | y3 = y2 |

204

Derivations: 206

$x3 = x2 - y2$
$\phantom{x3} = x1 - (x1 - y1)$
$\phantom{x3} = y1$
$\phantom{x3} = y0$ $y3 = y2$
$\phantom{y3} = x1 - y1$
$\phantom{y3} = x0 + y0 - y0$
$\phantom{y3} = x0$ (x, y integers; machine precision aside)

Computed Behavior:

208
True ->
  x := y
  y := x
Swaps values of x and y

Conditional
Concurrent
Assignment
(CCA)

CALL TRACE GENERATION VIA BEHAVIOR COMPUTATION

CROSS REFERENCE TO RELATED APPLICATIONS

The present U.S. Utility Patent Application claims priority pursuant to 35 U.S.C. § 119(e) to U.S. Provisional Application No. 62/397,747, entitled "CALL TRACE GENERATION VIA BEHAVIOR COMPUTATION," filed Sep. 21, 2016, which is hereby incorporated herein by reference in its entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL

Linger et al.: "Function Extraction Technology: Computing the Behavior of Malware", IEEE Reliability Society 2009 Annual Technology Report is hereby incorporated by reference in its entirety.

BACKGROUND

Technical Field

The present disclosure relates to a method and system for static analysis of binary computer executable files. More specifically, it is related to computed behavior applications.

Description of Related Art

Software is changing everything about how we work and live. Today, virtually every organization in business and government is irreversibly dependent on complex systems of billions of lines of code. But what does this code do? Does anyone know for sure? Security and reliability are essential, yet each day brings news of another attack. Security is more reactive than proactive; "bad guys" insert malware, "good guys" try to find it. The result? A never-ending game of catch-up with costly and painful consequences.

Why is this still true after decades of investment in security? The complexity of modern systems makes it impossible for software engineers to understand all possible execution paths with current methods. And, unknown paths can contain exploitable errors or malicious code.

Computing software behavior to manage risks and costs is an approach that applies advanced mathematics to compute a behavior of software at machine speeds to reveal its functionality and expose hidden malicious content. Key information about the behavior and risks of critical software can be revealed.

Disadvantages of conventional approaches will be evident to one skilled in the art when presented in the disclosure that follows.

BRIEF DESCRIPTION OF THE SEVERAL VIEWS OF THE DRAWING(S)

FIG. 2 is a block diagram showing an example embodiment of computed behavior in accordance with the present disclosure;

DETAILED DESCRIPTION

Figure 1:
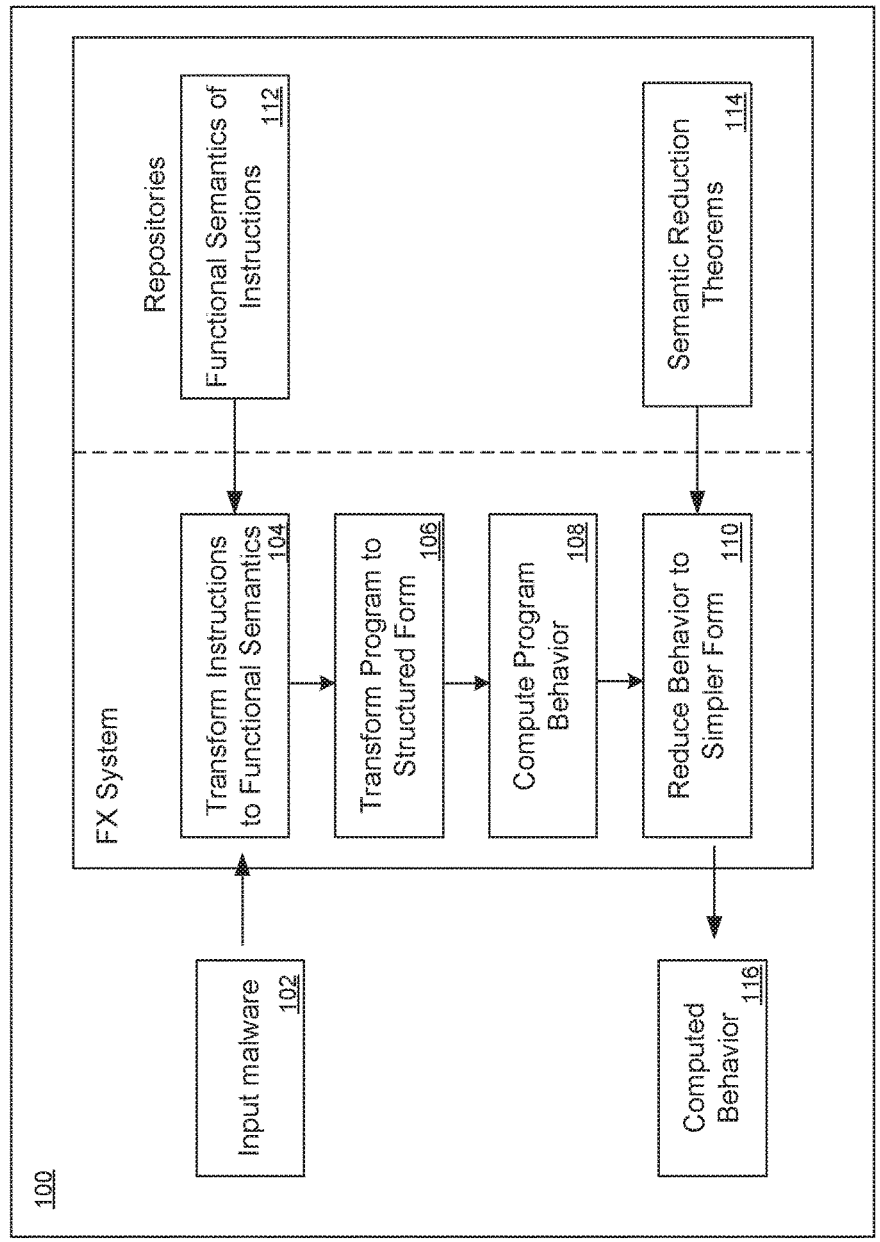
FIG. 1 is a block diagram showing an embodiment of computed behavior in accordance with the present disclosure.

The embodiments of the present disclosure may be practiced in a variety of computing devices that operate in a wired or wireless environment or network. The embodiments of the present disclosure may be readily adapted to multiple standards, protocols, programs, computer languages, etc.

The technology as described herein operates on deep functional semantics to thoroughly analyze an actual meaning of software, not just its syntax, without the need to access source code or execute potentially malicious code. Unlike testing, which can exercise only a fraction of possible execution paths, or syntactic scanning, which detects only malicious patterns for which signatures exist, the technology described herein, in various embodiments, computes the as-coded behavior of compiled software, and expresses it in terms of how it accesses and updates the state of the system. This computed behavior can be forever associated with the code, and updated anytime as the code evolves.

Computer behavior further provides automated analysis for malicious content in both pre- and post-deployment software. The analysis is accurate, comprehensive, and actionable. Complete results are available in far less time and at far lower cost than relying on expensive and fallible manual analysis.

Basic computed behavior is taught by Linger et al. in "Function Extraction Technology: Computing the Behavior of Malware", which is incorporated by reference.

The objective of function extraction technology is to compute the behavior of software to the maximum extent possible with precision. Computed behavior defines what a program does in all possible circumstances of use and can be described as the as-built specification of the code.

One objective of behavior computation is to produce a net functional effect of the sequential logic of a program in all circumstances of use with precision to the maximum extent possible. This process is subject to theoretical limitations, for example in loop behavior computation.

Software behavior computation is enabled by a Structure Theorem and a Correctness Theorem. The Structure Theorem guarantees the sufficiency of single-entry-single-exit sequence, alternation, and iteration control structures to represent any sequential program. The constructive proof of the Theorem defines an algorithm for transforming arbitrary control flow containing jumps into function-equivalent form expressed as an algebraic structure of nested and sequenced control structures. This structure is a necessary precondition for behavior computation.

The Correctness Theorem defines the transformation of procedural control structures, including sequence, ifthenelse, and whiledo, into procedure-free functional forms. The functional forms represent the behavior signatures of the control structures. They can be obtained through function composition and case analysis as described below (for control structure labeled P, operations on data labeled g and h, predicate labeled p, and program function labeled f). These function equations are independent of language syntax and program subject matter, and define the mathematical starting point for behavior calculation.

The behavior signature of a sequence control structure:
P: g; h
can be given by $$f=[P]=[g;h]=[h]o[g]$$

where the square brackets denote the behavior signature of the enclosed program and "o" denotes the composition operator. That is, the program function of a sequence can be calculated by ordinary function composition of its constituent parts.

The behavior signature of an alternation control structure:
P: if p then g else h endif
can be given by $$f = [P] = [\text{if } p \text{ then } g \text{ else } h \text{ endif}]$$
$$= ([p] = \text{true} \rightarrow [g] \mid [p] = \text{false} \rightarrow [h])$$

where | is the "or" symbol. That is, the program function of an alternation is given by a case analysis of the true and false branches.

The behavior signature of an iteration control structure:
P: while p do g enddo
can be expressed using function composition and case analysis in a recursive equation based on the equivalence of an iteration control structure and an iteration free control structure (an ifthen structure):

$$f = [P] = [\text{while } p \text{ do } g \text{ enddo}]$$
$$= [\text{if } p \text{ then } g; \text{while } p \text{ do } g \text{ enddo endif}]$$
$$= [\text{if } p \text{ then } g; f \text{ endif}]$$

This recursive functional form must undergo additional transformations to arrive at a representation of loop behavior that is readily understandable.

The roots of the Correctness Theorem are found in denotational semantics. The functional behavior defined by the Correctness Theorem is identical to that of the control structure from which it is computed, that is, the computed behavior and corresponding control structure are functionally equivalent mappings of inputs into outputs. Thus, computed behaviors can be freely substituted for corresponding control structures. Such substitution defines a stepwise process of behavior computation, whereby the algebraic control structure hierarchies produced by the Structure Theorem are traversed from bottom to top. At each step, net effects of control structures are composed and propagated while procedural details are left behind.

FIG. 1 is a block diagram showing an embodiment of behavior computation in accordance with the present disclosure. To see how a behavior computation system works, consider an architecture diagram 100 as shown. A behavior computation system operates on binary computer executable files. The algorithmic process of behavior computation may include four principal steps as follows. In step 104, instructions are transformed to functional semantics. Behavior computation operates at the level of functional semantics 112 of program instructions, not syntactic representations.

Each instruction in an input program is transformed into a functional form that defines the net effect of the instruction on the state of the system. For example, an add instruction operating on registers not only produces a sum, but also changes the values of certain flag registers on the processor. The instruction transformation is driven by a predefined repository of instruction semantics as shown. In step 106, a program is transformed into a structured form. The true control flow of the input program, including any computed jumps and branching logic, is determined by deterministic reachability analysis in a frontier propagation algorithm. The program is transformed into structured form as guided by a constructive proof of the Structure Theorem. This step expresses the program in an algebraic structure of single-entry, single-exit control structures including sequence, "ifthenelse", and "whiledo".

In step 108, the program behavior is computed. Behavior computation can now be carried out, guided by the Correctness Theorem that defines transformations from procedural structures to non-procedural behavior expressions. A significant amount of mathematical processing is required for this step including accommodation of theoretical limitations on loop behavior computation.

In step 110, behavior is reduced to a final (simpler) form. The computations of step 108 account for all behavior, even taking machine precision into account. This initial behavior is now reduced to final form. In analogy, recall high school algebra and the need to reduce expressions such as (3×3+2×2−×3+4×2) to (2×3+6×2). This process is driven by a repository of Semantic Reduction Theorems (SRTs) as shown in the figure as 114. These microtheorems encapsulate information required to reduce terms in computed behavior to simpler form. The theorems are very general and widely applicable. For example, the library of SRTs for finite arithmetic provides reductions for arithmetic expressions. In addition, computed behavior can exhibit structural relationships useful for organization and presentation. For example, behavior expressions often contain repeated substructures that can be factored and abstracted.

FIG. 2 is a block diagram showing an example embodiment of computed behavior in accordance with the present disclosure. In this example embodiment 200, consider a three-line program 202 that operates on small integers x and y (":=" is the assignment operator). It is not immediately obvious what the program is doing, but its effect can be calculated with a trace table 204 as shown. The table 204 contains a row for each assignment and a column for each variable assigned. Each row shows the effect of its assignment on variables x and y (in the first row, "0" signifies "old value," 1 signifies "new value, and similar for the other rows). Derivations 206 apply algebraic substitutions and reductions in a function composition process to arrive at output values for the program expressed in terms of input values, with intermediate operations abstracted out. This computation 208 reveals that the program is a swap that exchanges the initial values of x and y. The behavior is expressed in terms of a conditional concurrent assignment (CCA). The condition is true (the sequence is always executed since it contains no branching logic), and the assignments to final x and y are carried out concurrently, that is, all expressions on the right of the assignment operators are assigned to all targets on the left at the same time. This CCA structure is the only statement form required in the behavior expression language used by a function extraction system.

When behavior is computed, specifics of procedural implementations are replaced by net behavior that can represent a variety of algorithmic strategies. This simple example depicts generation of behavior knowledge through function composition and illustrates key properties of the process.

Figure 3:
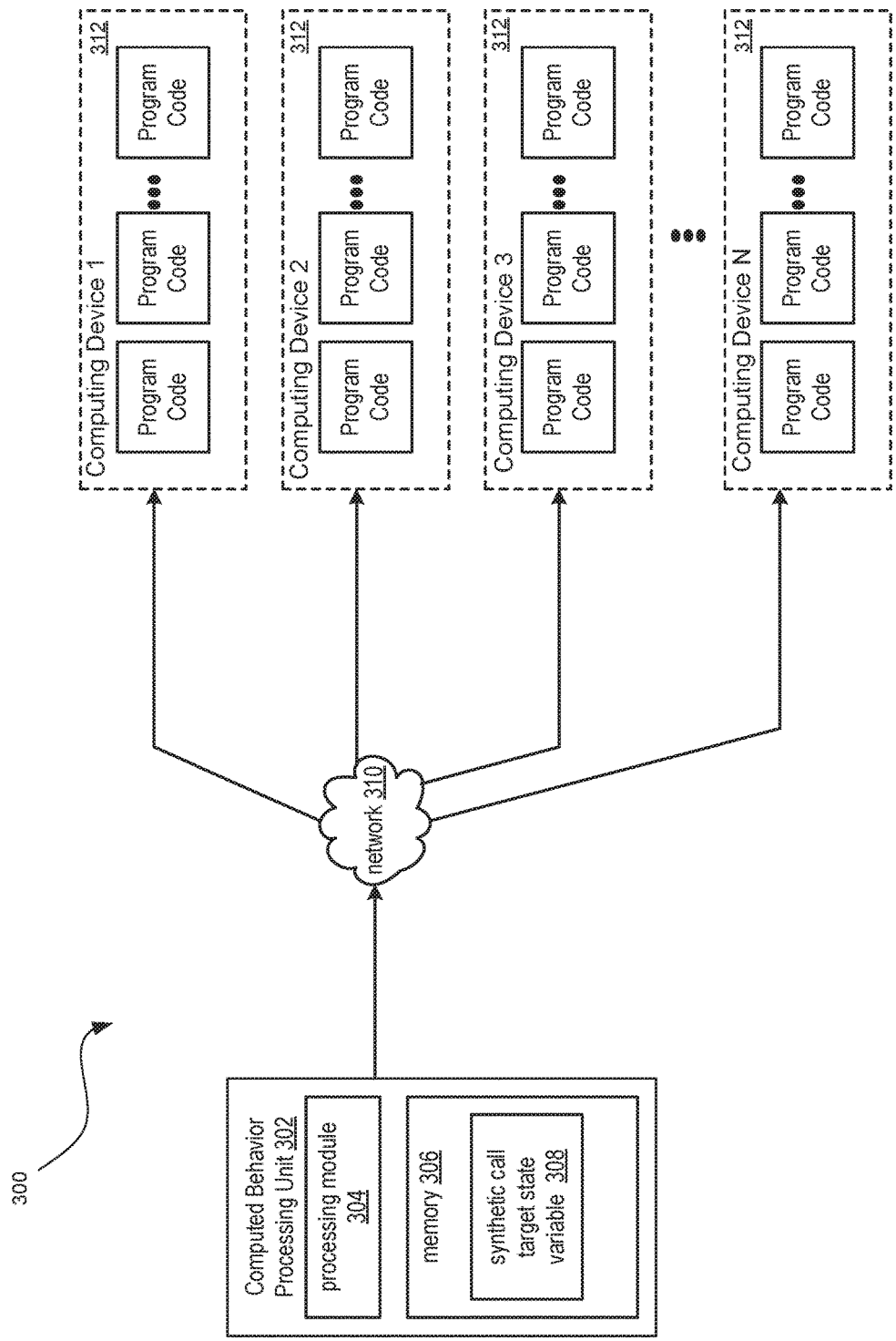
FIG. 3 is a block diagram showing a networked system environment in accordance with the present disclosure.

FIG. 3 illustrates one environment for practicing an embodiment of the present disclosure. FIG. 3 shows a computing system 300 that includes a computed behavior processing unit 302. Computed behavior processing unit 302 includes at least a processing module 304, memory 306, and storage of synthetic call target state variables 308 in memory 306.

Figure 4:
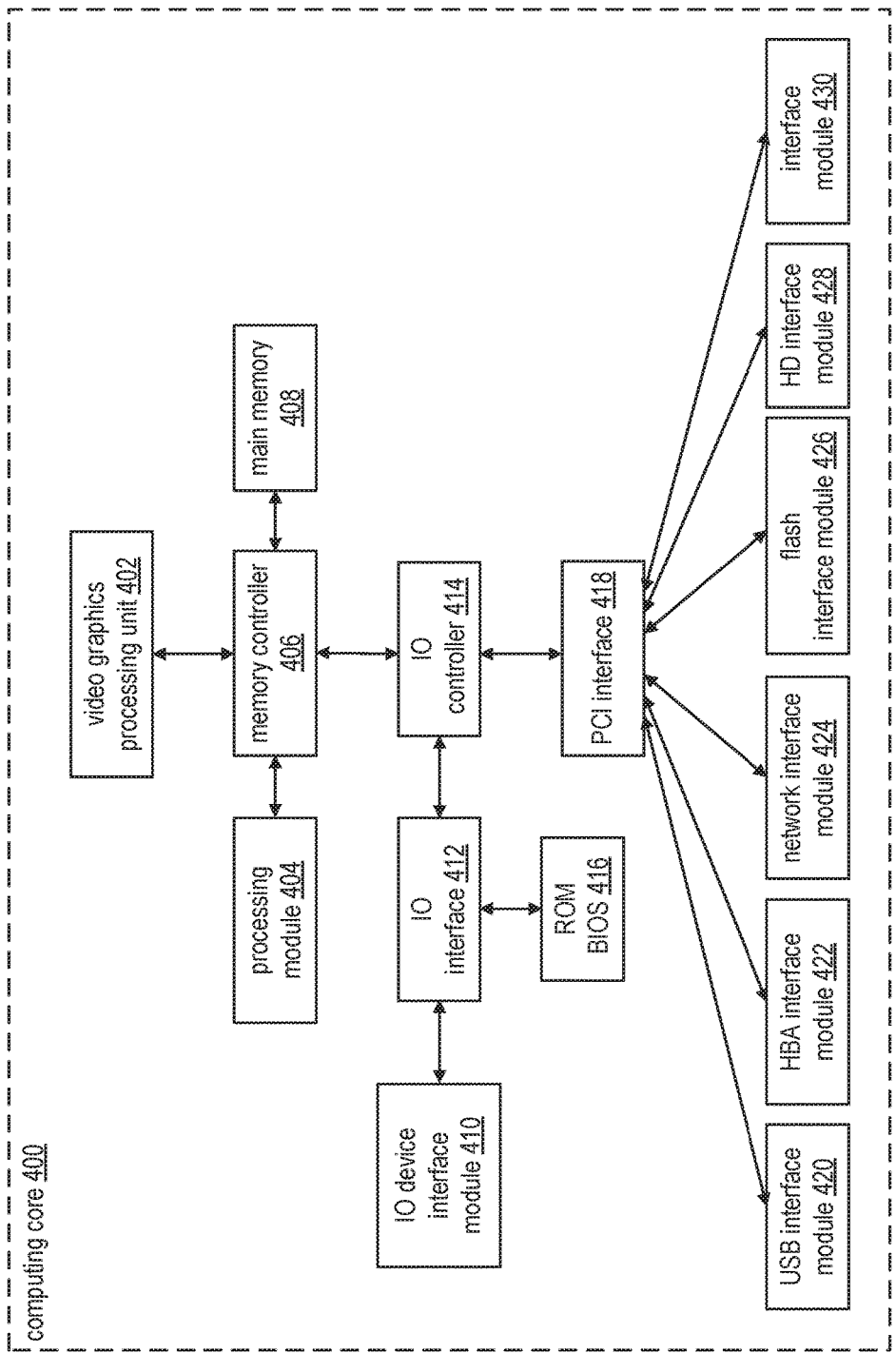
FIG. 4 is a block diagram showing an embodiment of a computing device in accordance with the present disclosure.

Computing devices 312 include any computing device 1-N with a computer processor, interfaces, I/O, communication capabilities, and memory (as is known and further described in FIG. 4). Such devices include, but are not limited to, servers, personal computers, laptops, tablets, smartphones, IOT (Internet of Things) devices), etc. The computing devices used in the environment of the technology described herein only require a capacity to store in computer memory a program (code). That program can be downloaded, uploaded, streamed, replicated or otherwise processed as is known in the art. The computing devices may be hardwired, connected wirelessly or both. These computing devices can, in one embodiment, be operably coupled to network hardware via respective local area network (LAN) connections, WAN, Internet, cloud connected processing and storage. Network hardware, which may be a router, switch, bridge, modem, system controller, etc., may provide a wide area network (WAN) connection for a communication system. One or more of the shown computing devices 1-N may include circuitry and/or software which allow the particular device to communicate with each other or with proximal or remote devices.

FIG. 4 is a schematic block diagram of an embodiment of a computing core 400 usable in either computed behavior processing unit 302 or computing devices 312. The computing core includes, but is not limited to, one or more of: a video graphics processing unit 402, processing module 404, a memory controller 406, main memory 408, an input/output (JO) controller 414, a peripheral component interconnect (PCI) interface 418, an JO interface module 412, at least one JO device interface module 410, a read only memory (ROM) basic input output system (BIOS) 416, and one or more memory interface modules. The one or more memory interface module(s) includes one or more of a universal serial bus (USB) interface module 420, a host bus adapter (HBA) interface module 422, a network interface module 424, a flash interface module 426, a hard drive interface module 428, and an interface module 430.

Interface module 430 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). Further note that the I/O device interface module 410 and/or the memory interface modules may be collectively or individually referred to as I/O ports.

When analyzing an unknown binary computer executable file, it is useful to know the external behavior of the executable, that is, the actions performed by the executable that modify the state of the system in which the executable is running. Given that executables typically interact with the operating environment through external API calls, this external behavior can be expressed as call traces showing the various sequences of external API calls the executable can make. These API call traces can be generated via function extraction functionality as provided by the technology described herein. Note that the technology described herein tracks calls to local functions in addition to external API calls, that is, all function calls are tracked in the call traces.

Figure 5:
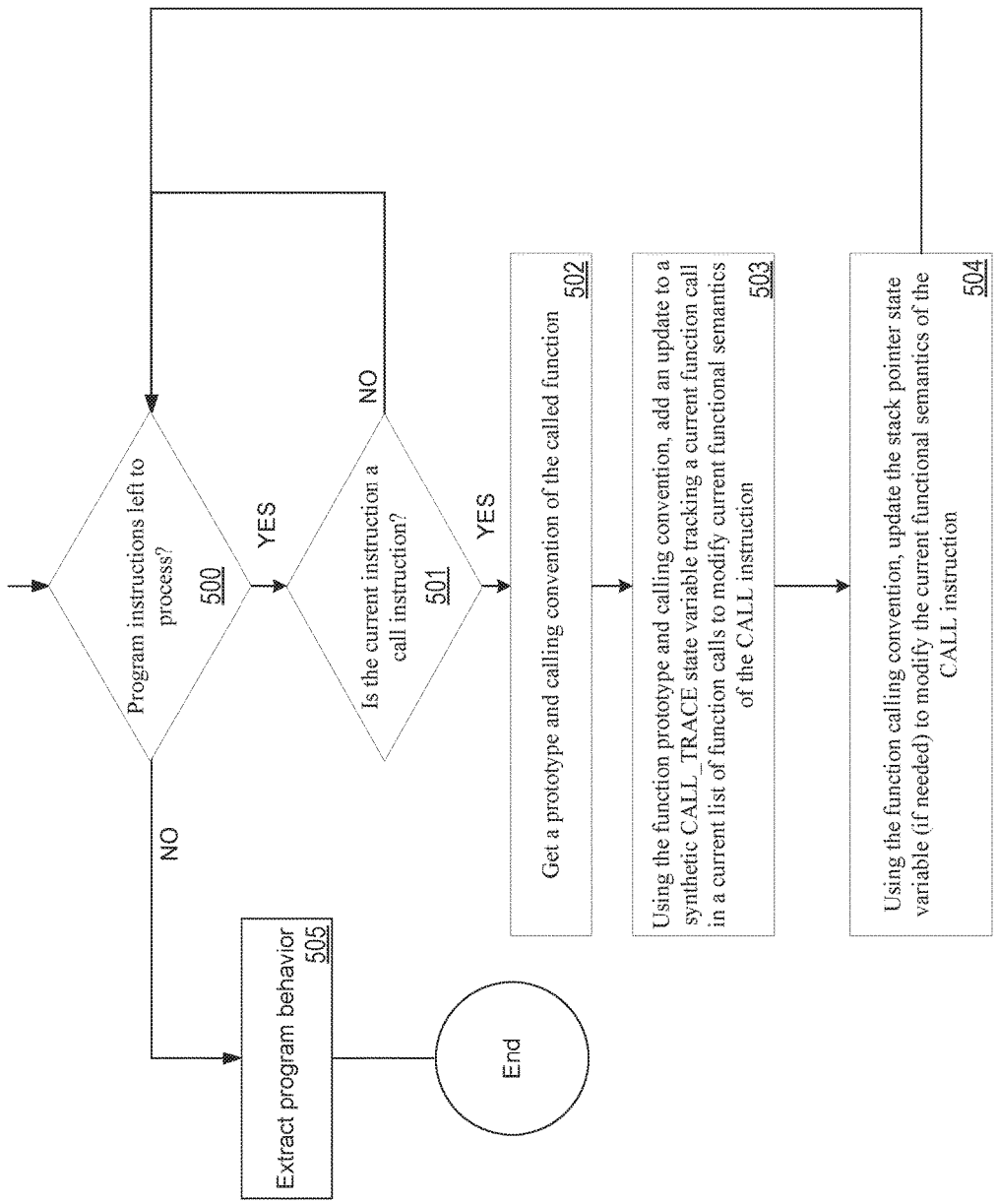
FIG. 5 is a flowchart illustrating an example of call trace generation via behavior computation in accordance with the present disclosure.

FIG. 5 is a flowchart illustrating an example embodiment of call/jump target resolution via behavior computation. In particular, a method is presented for use in conjunction with one or more functions and features described in conjunction with FIGS. 1-4, and also FIG. 5.

As shown in FIG. 5, the method begins at step 500, where a processing module initiates a process to augment the functional semantics of each CALL instruction with detailed information about the specific called function. If instructions in the binary executable remain to be checked and augmented (program instructions left to process), the method continues at step 501, where a processing module checks to see if the current instruction is a CALL instruction, where a CALL instruction is the native microcode of the chip architecture that calls a function.

If the current instruction is a CALL instruction, the method continues at step 502, where information about the called function is looked up from a source. The specific information needed to augment the CALL instruction functional semantics is the prototype of the called function (specifically the number and size of the function arguments) and the calling convention used to call the current function (for example, stdcall (standard calling convention is used to call Win32 API functions), cdecl (default calling convention for C and C++ programs), etc.).

The method continues at step 503, where a processing module extends the instruction semantics of the current call instruction with additional semantics by adding the current called function, either a local function or an external API call, to an existing call trace represented by a synthetic call trace state variable (CALL_TRACE). CALL_TRACE is a synthetic state variable because it does not directly correspond to the actual physical state of the underlying CPU, as is the case for state variables representing the values of registers, flags, etc. A local function call or an external API call is represented in the call trace as a symbolic expression containing the following information: name of the called function; address of the call instruction and symbolic expressions representing stack/register reads for each argument of the called function.

The method continues at step 504, where additional updates to the stack register are added to the instruction semantics of the CALL instruction to account for any function argument cleanup taken care of by the called function.

Once the instruction semantics of all CALL instructions have been augmented with information about the functions being called, the method continues to step 505, where the behavior of the program is computed using the previously described function extraction process, at which point the behavior of the program in terms of function call traces has been computed.

The end result of the process described above is the program behavior showing: what external API and local call traces are made, conditions under which each call trace will be executed and actual argument values for the arguments of each function call. This call trace information is contained in the CALL_TRACE variable of the final computed program behavior.

While the various embodiments disclosed herein are applicable to any known or future code with call instructions, in one embodiment they may be applicable to deciphering whether malware exists within a selection of code.

Current methods of malware analysis are increasingly challenged by the scope and sophistication of attacks. Recent advances in software behavior computation illuminate an opportunity to compute the behavior of malware at machine speeds, to aid in understanding intruder methods and developing countermeasures. The behavior computation process helps eliminate certain forms of malware obfuscation and computes the net effects of the remaining functional code.

Malware often exhibits a fundamental vulnerability that can be exploited by defenders. No matter how a malware package is obfuscated, and no matter what attack strategy it implements, it must ultimately execute on a target machine to achieve its objectives. That is, the intended behavior of a malware package must be realized through ordinary execution of instructions and manipulation of memory, just as must the intended behavior of legitimate software. A potential Achilles heel of malware is literally its functional behavior which must achieve a purpose intended by the attacker. However, application of software behavior computation can assist in eliminating certain forms of obfuscation in malware and derive the net behavior of the remaining functional code.

Behavior computation as per FIGS. 1-5 operates on binary computer executable files such as malware coded in or compiled into, for example, Intel assembly language. When behavior is computed, specifics of procedural implementations are replaced by net behavior that can represent a variety of algorithmic strategies. This property assists in identifying and analyzing malware families.

Binary executable files typically contain call or jump instructions where the call/jump target is computed at run time. When performing static analysis of these executable files it is necessary to resolve computed call/jump targets to actual target addresses. Computed call/jump targets may be resolved to detect potential malware by using the behavior extraction capabilities of the technology described herein.

One or more benefits of the present disclosure include, but are not limited to, detect malware using computed behavior to overcome the requirement for a detailed code/instruction analysis.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, processing times, and/or accuracy. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module). As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items provides a desired relationship. For example, when the desired relationship is that a measurement metric 1 has a greater magnitude than measurement metric 2, a favorable comparison may be achieved when the magnitude of a measurement metric value 1 is greater than that of signal 2 or when the magnitude of a measurement metric value 2 is less than that of signal 1.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method of statically computing a behavior of a computer program in terms of function call traces, the method comprises:
    tracking, by one or more computing devices, function calls in a synthetic call trace state variable of a computer program;
    extending, by the one or more computing devices, instruction semantics of call instructions with additional semantics by adding a current function call, including one or more of a local function call or an external API call, to an existing call trace represented by the synthetic call trace state variable;
    adding, by the one or more computing devices, additional updates to a stack register to instruction semantics of one or more instructions of a single function call to account for function argument cleanup processed by the single function call; and
    extracting a computed behavior of the computer program.

2. The method of claim 1, wherein the synthetic call trace state variable contains a symbolic representation of function calls made.

3. The method of claim 1, further comprising representing a single function call in the existing call trace as a symbolic expression.

4. The method of claim 3, wherein the symbolic expression includes one or more of:
    name of a function of the single function call;
    address of one or more instructions of the single function call;
    stack reads for each argument of the function of the single function call; or
    register reads for each argument of the function of the single function call.

5. The method of claim 4, wherein the symbolic expression comprises call traces filled in with actual argument values during the extracting of the computed behavior of the computer program.

6. The method of claim 1, wherein the computer program includes any of:
    binary computer executable files;
    malware coded in an assembly language; or
    malware compiled into an assembly language.

7. The method of claim 1, wherein the extracting of the computed behavior of the computer program further comprises replacing specifics of procedural implementations with net behavior representing one or more algorithmic strategies for detecting malware.

8. A non-transitory computer readable storage medium comprises computer program behavior computation, the non-transitory computer readable storage medium comprises:
    at least one memory section that stores operational instructions that, when executed by one or more processing modules of one or more computing devices, causes the one or more computing devices to:
        track function calls in a synthetic call trace state variable of a computer program;
        extend instruction semantics of call instructions with additional semantics by adding a current function call, including one or more of a local function call or an external API call, to an existing call trace represented by the synthetic call trace state variable;
        add additional updates to a stack register to instruction semantics of one or more instructions of a single function call to account for function argument cleanup processed by the single function call; and extract a computed behavior of the computer program.

9. The non-transitory computer readable storage medium of claim 8, wherein the synthetic call trace state variable contains a symbolic representation of function calls made.

10. The non-transitory computer readable storage medium of claim 8, wherein the one or more computing devices is further caused to represent a single function call in the existing call trace as a symbolic expression.

11. The non-transitory computer readable storage medium of claim 10, wherein the symbolic expression includes one or more of:
   name of a function of the single function call;
   address of one or more instructions of the single function call;
   stack reads for each argument of the function of the single function call; or
   register reads for each argument of the function of the single function call.

12. The non-transitory computer readable storage medium of claim 11, wherein the symbolic expression comprises call traces filled in with actual argument values during the extracting of the computed behavior of the computer program.

13. The non-transitory computer readable storage medium of claim 8, wherein the computer program includes any of:
   binary computer executable files;
   malware coded in an assembly language; or
   malware compiled into an assembly language.

14. A computing device of a group of computing devices, the computing device comprises:
   an interface;
   a local memory; and
   a processing module operably coupled to the interface and the local memory, wherein the processing module functions to:
      track function calls in a synthetic call trace state variable of a computer program;
      extend instruction semantics of call instructions with additional semantics by adding a current function call, including one or more of a local function call or an external API call, to an existing call trace represented by the synthetic call trace state variable;
      add additional updates to a stack register to instruction semantics of one or more instructions of a single function call to account for function argument cleanup processed by the single function call; and
      extract a computed behavior of the computer program.

15. The computing device of claim 14, wherein the synthetic call trace state variable contains a symbolic representation of function calls made.

16. The computing device of claim 14, wherein the processing module further functions to represent a single function call in the existing call trace as a symbolic expression.

17. The computing device of claim 16, wherein the symbolic expression includes one or more of:
   name of a function of the single function call;
   address of one or more instructions of the single function call;
   stack reads for each argument of the function of the single function call; or
   register reads for each argument of the function of the single function call.

18. The computing device of claim 17, wherein the symbolic expression comprises call traces filled in with actual argument values during the extracting of the computed behavior of the computer program.

* * * * *